United States Patent
Baxi et al.

(10) Patent No.: US 9,234,610 B2
(45) Date of Patent: Jan. 12, 2016

(54) ALUMINUM FOIL BASED HOSE

(75) Inventors: Nikhil Baxi, Cordova, TN (US); Paul Alan Guess, Covington, TN (US); Eugene A. Dianetti, Collierville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 1394 days.

(21) Appl. No.: 12/741,870

(22) PCT Filed: Sep. 30, 2008

(86) PCT No.: PCT/US2008/078287
§ 371 (c)(1),
(2), (4) Date: Oct. 14, 2010

(87) PCT Pub. No.: WO2009/061566
PCT Pub. Date: May 14, 2009

(65) Prior Publication Data
US 2011/0017338 A1    Jan. 27, 2011

Related U.S. Application Data

(60) Provisional application No. 60/986,106, filed on Nov. 7, 2007.

(51) Int. Cl.
*F16L 11/00*    (2006.01)
*F16L 11/08*    (2006.01)
(Continued)

(52) U.S. Cl.
CPC ............ *F16L 11/085* (2013.01); *B21C 37/08* (2013.01); *B21C 37/154* (2013.01); *B21F 19/00* (2013.01); *B23K 31/02* (2013.01); *B32B 1/08* (2013.01); *B32B 3/02* (2013.01); *B32B 3/18* (2013.01); *B32B 7/12* (2013.01); *B32B 15/02* (2013.01);
(Continued)

(58) Field of Classification Search
CPC ............ F16L 9/121; F16L 9/147; F16L 9/17; F16L 11/14
USPC ................ 138/137, 138, 141, 143, 169, 171; 428/36.91
See application file for complete search history.

(56) References Cited

U.S. PATENT DOCUMENTS 3,359,351 A * 12/1967 Bender .................. 264/46.9
3,379,824 A *  4/1968 Kempf ................. 174/105 R
(Continued)

FOREIGN PATENT DOCUMENTS

CN         1357702       7/2002
DE         3319515      11/1984
(Continued)

OTHER PUBLICATIONS

International Search Report for PCT/US2008/078287 dated Dec. 1, 2008.
(Continued)

*Primary Examiner* — James Hook
(74) *Attorney, Agent, or Firm* — Renner, Otto, Boisselle & Sklar, LLP

(57) ABSTRACT

An ultra low permeability fluid member for conveying a fluid (e.g., a hose, tube, etc.) having a metal vapor barrier layer (22) formed around an inner tube (14). The metal vapor layer (22) is formed from one or more metal strips (40*a*, 40*b*) having edge portions (44) that are bonded so as to seal the vapor barrier layer (22) preventing permeation of vapor.

20 Claims, 3 Drawing Sheets

(51) Int. Cl.
*B21C 37/08* (2006.01)
*B21C 37/15* (2006.01)
*B21F 19/00* (2006.01)
*B23K 31/02* (2006.01)
*B32B 1/08* (2006.01)
*B32B 15/08* (2006.01)
*B32B 15/20* (2006.01)
*F16L 9/147* (2006.01)
*B32B 7/12* (2006.01)
*B32B 15/02* (2006.01)
*B32B 15/06* (2006.01)
*B32B 25/10* (2006.01)
*B32B 25/16* (2006.01)
*B32B 3/02* (2006.01)
*B32B 3/18* (2006.01)
*F16L 11/04* (2006.01)

(52) U.S. Cl.
CPC ............... *B32B 15/06* (2013.01); *B32B 15/08* (2013.01); *B32B 15/20* (2013.01); *B32B 25/10* (2013.01); *B32B 25/16* (2013.01); *F16L 9/147* (2013.01); *B23K 2201/06* (2013.01); *B23K 2203/10* (2013.01); *B32B 2262/0269* (2013.01); *B32B 2262/0276* (2013.01); *B32B 2262/103* (2013.01); *B32B 2307/7242* (2013.01); *B32B 2307/7244* (2013.01); *B32B 2597/00* (2013.01); *B32B 2605/00* (2013.01); *F16L 2011/047* (2013.01)

(56) References Cited

U.S. PATENT DOCUMENTS

| | | | |
|---|---|---|---|
| 3,528,876 A * | 9/1970 | von Clave-Bouhaben et al. | 138/143 |
| 3,720,994 A | 3/1973 | Wagele | |
| 3,838,713 A | 10/1974 | Tubbs | |
| 3,857,415 A | 12/1974 | Morin et al. | |
| 3,927,464 A * | 12/1975 | Wallsten | 29/454 |
| 3,934,064 A | 1/1976 | Lowthian | |
| 3,986,341 A | 10/1976 | DeHaan | |
| 4,565,668 A * | 1/1986 | Aslund | B22F 3/04 264/313 |
| 4,758,455 A * | 7/1988 | Campbell et al. | 428/35.9 |
| 4,900,383 A * | 2/1990 | Dursch et al. | 156/184 |
| 5,488,975 A | 2/1996 | Chiles et al. | |
| 5,538,294 A | 7/1996 | Thomas | |
| 5,622,210 A | 4/1997 | Crisman et al. | |
| 5,839,478 A * | 11/1998 | Colcombet et al. | 138/141 |
| 5,960,977 A | 10/1999 | Ostrander et al. | |
| 6,074,717 A | 6/2000 | Little et al. | |
| 6,102,078 A | 8/2000 | Kramer, Jr. | |
| 6,213,156 B1 * | 4/2001 | Niki et al. | 138/126 |
| 6,237,641 B1 * | 5/2001 | Niki et al. | 138/126 |
| 6,328,075 B1 * | 12/2001 | Furuta et al. | 138/143 |
| 6,345,647 B2 * | 2/2002 | Niki et al. | 138/126 |
| 6,354,332 B1 | 3/2002 | Burkhardt et al. | |
| 6,581,643 B2 | 6/2003 | Guippe et al. | |
| 6,652,939 B2 | 11/2003 | Smith et al. | |
| 6,838,141 B2 | 1/2005 | Ikemoto et al. | |
| 6,974,614 B2 | 12/2005 | Smith et al. | |
| 6,988,515 B2 | 1/2006 | Oishi et al. | |
| 7,052,751 B2 | 5/2006 | Smith et al. | |
| 7,055,553 B2 | 6/2006 | Bessette et al. | |
| 7,077,166 B2 | 7/2006 | Heo et al. | |
| 7,857,010 B1 | 12/2010 | Davidson | |
| 2003/0001307 A1 * | 1/2003 | Miller | 264/171.12 |
| 2003/0127147 A1 | 7/2003 | Van Dam et al. | |
| 2004/0182463 A1 | 9/2004 | Bessette et al. | |
| 2005/0170122 A1 | 8/2005 | Fahrenholz et al. | |
| 2005/0241714 A1 | 11/2005 | Barnhouse et al. | |
| 2007/0193642 A1 * | 8/2007 | Werner et al. | 138/127 |
| 2009/0308479 A1 | 12/2009 | Krauss et al. | |
| 2012/0159985 A1 | 6/2012 | Palmer | |

FOREIGN PATENT DOCUMENTS

| | | |
|---|---|---|
| EP | 0735305 | 10/1996 |
| EP | 1258340 | 11/2002 |
| JP | 03288083 A | 12/1991 |
| JP | 4211783 | 8/1992 |
| JP | 08270842 | 10/1996 |
| JP | 2003-336774 | 11/2003 |
| JP | H07-23894 | 11/2003 |
| WO | 2005055257 A1 | 11/2004 |
| WO | 2006/061442 | 6/2006 |
| WO | 2007/089869 | 8/2007 |

OTHER PUBLICATIONS

Office Action filed in corresponding Japanese Patent Application No. 2010-533136 mailed Feb. 13, 2013.

Office Action filed in corresponding in Chinese Patent Application No. 20080118925.9 issued on Sep. 11, 2011.

Office Action with translation issued in corresponding Japanese Patent Application No. 2014-027258 mailed Feb. 17, 2015.

* cited by examiner

ALUMINUM FOIL BASED HOSE

RELATED APPLICATIONS

This application claims the benefit of U.S. Provisional Application No. 60/986,106 filed Nov. 7, 2007, which is hereby incorporated herein by reference.

This application is a national phase of International Application No. PCT/US2008/078287 filed Sep. 30, 2008 and published in the English language.

FIELD OF THE INVENTION

The present invention relates generally to hoses, and more particularly to ultra-low permeation hoses.

BACKGROUND OF THE INVENTION

Low permeation hoses are often used in systems to eliminate or reduce escape and/or infiltration of vapors and/or gases. For example, such hoses may be used in refrigeration systems to prevent leakage of refrigerant vapors from the system into the environment. Such hoses are also common in fuel systems for preventing fuel vapors from escaping to the environment.

Another application of such hoses is in connection with heating systems for supplying and returning water (or other fluid) from one or more heat exchangers. In such applications, low permeation hoses are used to prevent oxygen from entering the heating system, which can result in corrosion of various components such as pumps and valves.

Low permeation hoses typically include an inner tube for carrying a fluid, and a vapor barrier layer surrounding the inner tube. Various other layers typically may surround the vapor barrier layer, such as a braiding, an outer tube, a cover or outer sheath, etc.

One type of hose that includes a metal foil as the vapor barrier layer is disclosed in U.S. Pat. No. 6,074,717. This patent describes a flexible hose including an inner tube, an aluminum vapor barrier layer formed from aluminum foil that is wrapped in overlapping fashion around the inner tube, and an outer tube surrounding the aluminum barrier layer. The aluminum barrier layer is bonded to both the inner tube and the outer tube. While this design may provide a hose that resists delamination of the tubes and/or the aluminum layer, the wrapped aluminum forming the barrier layer does not provide a continuous sealed barrier layer.

SUMMARY OF THE INVENTION

At least one embodiment of the invention provides a hose member for conveying fluid comprising a first tubular layer, a metal vapor barrier layer formed by at least one strip of metal surrounding the first tubular layer, and a second tubular layer surrounding the metal tubular layer, wherein the at least one metal strip has edge portions joined together to form at least one seam, and wherein the at least one seam is folded over a portion of the metal strip adjacent the seam.

At least one embodiment of the invention provides a method of making a hose comprising providing a first tubular layer forming a conduit for the flow of fluid, forming a metal barrier layer with at least one strip of metal surrounding the first tubular layer, the metal barrier layer having at least one radially outwardly extending seam running in the longitudinal direction of the hose that is folded over a portion of the metal strip adjacent the seam, and providing a second tubular layer surrounding the metal barrier layer.

At least one embodiment of the invention provides a hose member for conveying fluid comprising a first tubular layer, a metal vapor barrier layer surrounding the first tubular layer, the metal vapor barrier layer formed as a metal tube having at least one longitudinal seam formed radially outward from the metal tube, the longitudinal seam folded over a portion of the metal tube adjacent the longitudinal seam, and a second tubular layer surrounding the tubular metal vapor barrier layer.

Further features of the invention will become apparent from the following detailed description when considered in conjunction with the drawings.

DETAILED DESCRIPTION

Figure 1:
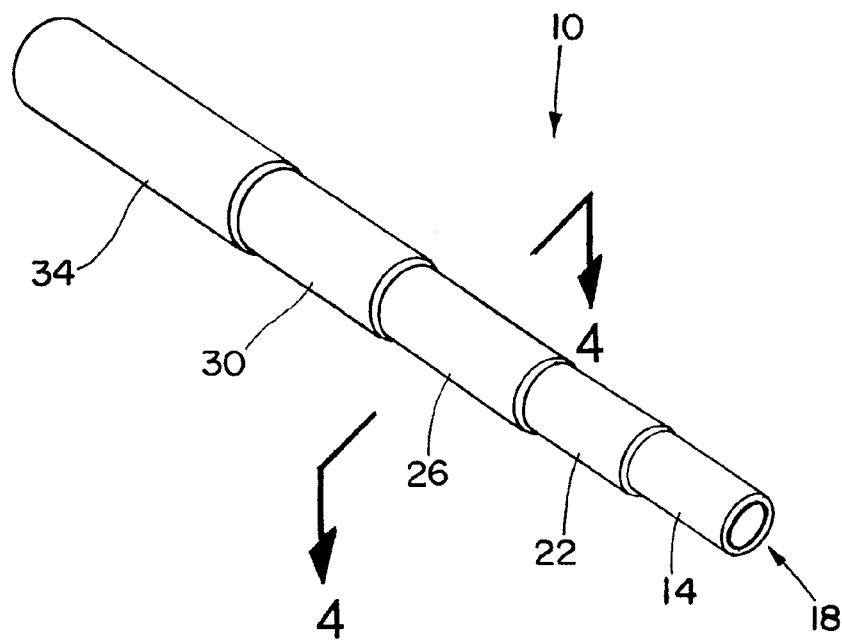
FIG. 1 is a perspective cut-away view of an exemplary fluid member in accordance with the invention.
Figure 2:
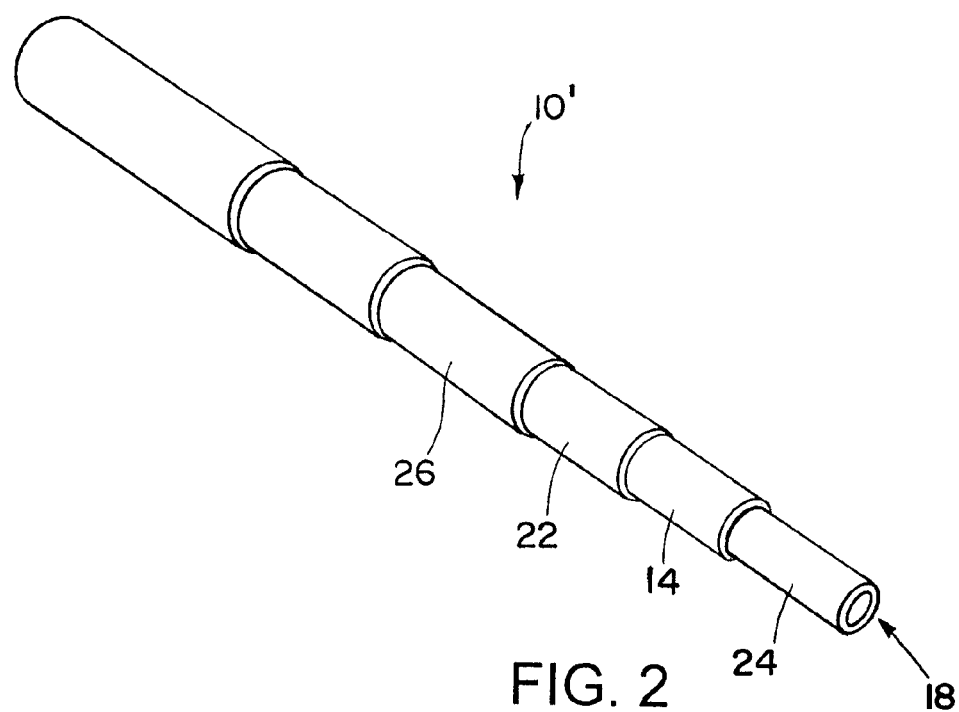
FIG. 2 is a perspective cut-away view of another exemplary fluid member in accordance with the invention.

Referring to the drawings in detail, and initially to FIGS. 1 and 2, a fluid member for conveying fluid in accordance with the invention is generally indicated by reference numeral 10. The fluid conduit member 10, which in the illustrated embodiments is in the form of a hose (but may also be a tube, pipe, etc.), includes a first tubular layer 14 surrounding an interior passage 18 through which fluid can flow. A metal vapor barrier layer 22 surrounds the first tubular layer 14. The first tubular layer 14 can be composed of any suitable material, such as an elastomer that promotes bonding of the metal vapor barrier layer 22, as will be described below.

The metal vapor barrier layer 22 can be made of any suitable metal, such as aluminum. As will be described in more detail below, the metal vapor barrier layer 22 is formed by at least one strip of metal that is formed around the first tubular layer 14 and sealed, such as by welding, so as to form a generally continuous sealed vapor barrier layer. A second tubular layer 26 surrounds the metal vapor barrier layer 22, followed by a braided layer 30 for reinforcement (polyester/metallic wire, Kevlar, or any other suitable braid), and a cover 34. The first and/or second tubular layers 14 and 26 can be bonded to the metal vapor barrier layer 22. As shown in FIG. 2, the hose 10' may further comprise additional layers such as an inner tubular layer 24 comprising a composite material or other suitable material. Other layers can also be provided between or in addition to the illustrated layers without departing from the scope of the invention.

Figure 3:
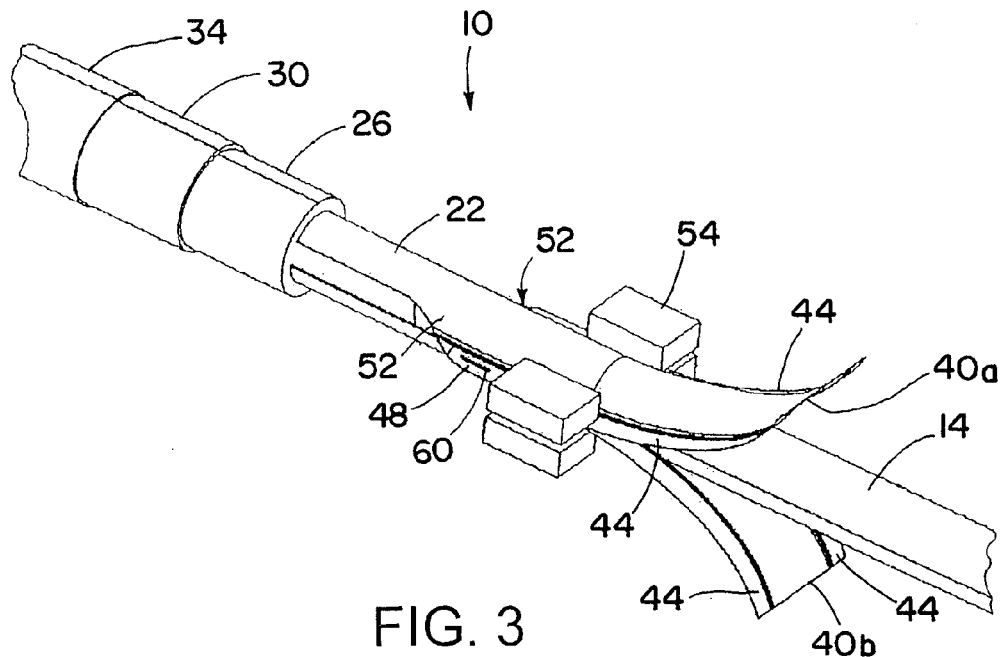
FIG. 3 is a perspective cut-away view of the fluid member of FIG. 1 in a partially formed state.

Turning now to FIG. 3, the hose 10 of FIG. 1 is illustrated in a partially formed state wherein the metal vapor barrier layer 22 is being formed around the first tubular layer 14. While the following description refers to the hose 10 of FIG. 1, it will be appreciated that it is equally applicably to the hose of FIG. 2.

In the embodiment of FIG. 3, the metal vapor barrier layer 22 is generally tubular and is formed by a pair of metal strips 40a and 40b that are pressed, rolled, or otherwise made to conform with an outer surface of the first tubular layer 14, or other layer as the case may be. The metal strips 40a and 40b can be aluminum foil, for example, and can be preformed into a suitable shape and applied to surround the first tubular layer 14, or may be formed to surround the first tubular layer 14 during application thereto.

Each metal strip 40a and 40b has opposite edge portions 44 that extend generally radially outwardly with respect to the longitudinal axis of the hose 10. Opposite edge portions from each metal strip 40a and 40b overlap respective opposite edge portions 44 of the other strip to form a pair of seams 48 that are generally diametrically opposed, but can be located in other positions about the circumference of the barrier layer 22 as desired.

The seams 48 typically will be bonded so as to seal the metal strips 40a and 40b together to form a continuous, sealed barrier layer. While merely folding the seams 48 (e.g., folding the seam in half, crimping the seam, etc) can achieve a suitable bond between the respective strips 40a and 40b, the radially outwardly extending seams 48 are well-suited for welding by a suitable welding apparatus, as will now be described.

As illustrated in FIG. 3, the radially outwardly extending seams 48 can be readily passed through an ultrasonic welding device 54 to bond the strips 40a and 40b together. By welding the seams 48, the metal vapor barrier layer 22 is effectively sealed around the circumference of the first tubular layer 14. The seams 48 can be bonded in other manners, such as with a suitable adhesive or via other suitable welding processes.

After the seams 48 are formed and/or bonded, each radially extending seam 48 is then folded over a portion 52 of one of the metal strips 40a or 40b that is adjacent each respective seam 48. As such, the seams 48 lie generally flat against the metal vapor barrier layer and follow its tubular contour.

Figure 4:
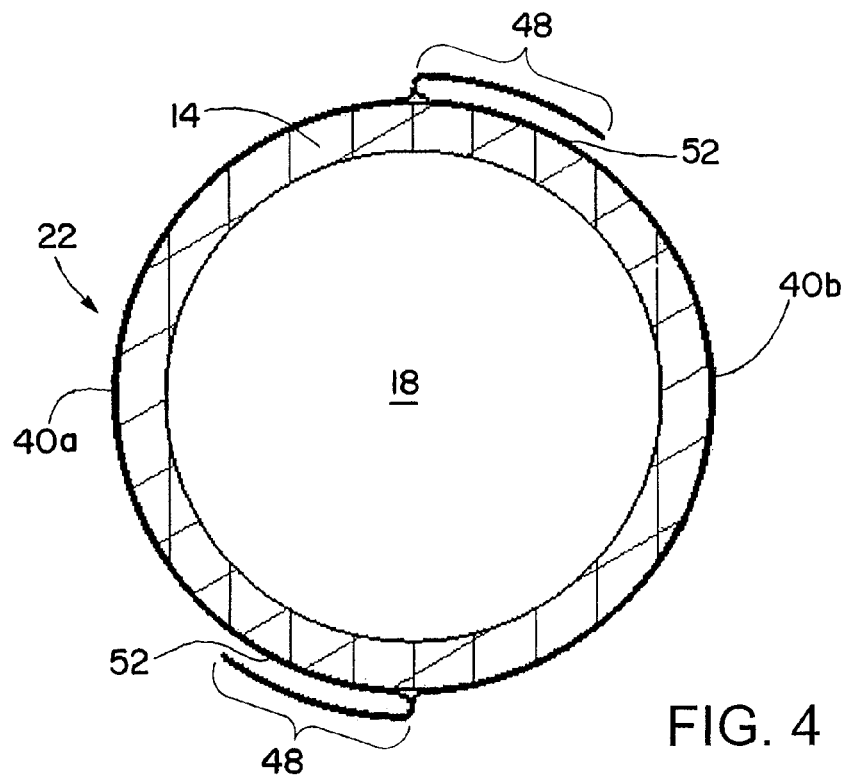
FIG. 4 is a cross-sectional view taken along the line 4-4 in FIG. 1.
Figure 5:
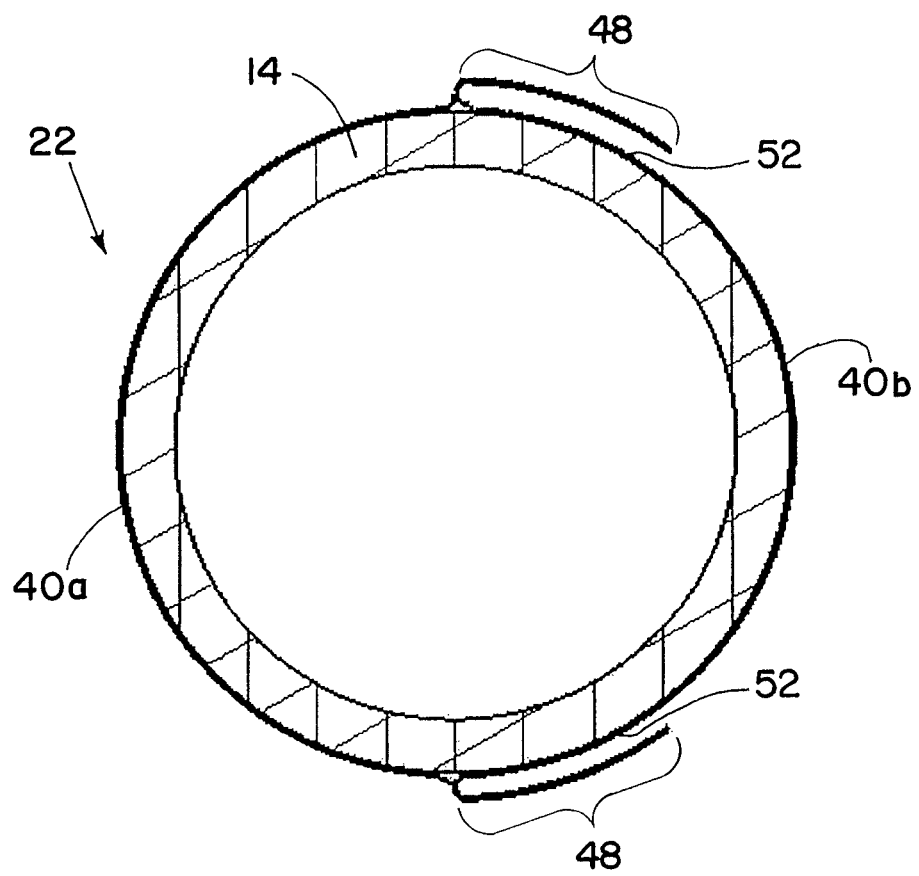
FIG. 5 is a cross-sectional view taken along the line 4-4 in FIG. 1 of an alternative embodiment.

For example, with reference to FIG. 4, which is a cross-section of the hose 10, the seams 48 are illustrated in a folded configuration. In this embodiment, the seams 48 extend in a common direction (e.g., clockwise) and are folded over portions 52 of the metal strips 40a and 40b adjacent the respective seams 48. In an alternative arrangement, illustrated in FIG. 5, the seams 48 extend in opposing directions. The seams 48 in FIGS. 4 and 5 are spaced apart from the adjacent portions 52 of the metal strips 40a and 40b for clarity, but in practice will generally be in contact with the portions 52.

In some applications, it may be desired to bond the seams 48 to the portions 52 of the metal strips 40a and/or 40b adjacent the seams 48. Accordingly, a suitable bonding agent 60 (FIG. 3), such as an adhesive, may be applied to the seams 48 and/or the adjacent portions 52 of the metal strips 40a and 40b prior to folding the seams 48. Alternatively, the seams 48 can be ultrasonically welded to the metal barrier layer 22 after folding. Bonding the seams 48 to the metal strips 40a and/or 40b can result in a more durable hose 10, and can prevent potential leakage from end faces of the hose 10 ensuring long-term performance.

Once the metal vapor barrier layer 22 and the second tubular layer 26 are in place, the metal vapor barrier layer 22 can be bonded to the first and/or second tubular layers 14 and 26. In this regard, the elastomer layers surrounding the metal vapor barrier layer 22, which can be ethylene propylene diene monomer (EPDM) rubber or other suitable material, may be blended with an additive to promote bonding with the metal vapor barrier layer material during subsequent curing of the elastomer layers, such as by vulcanization.

The above-described fluid members are particularly well-suited for commercial and automotive refrigeration systems, as well as air conditioning systems found in agriculture and off-highway vehicles, for example. Examples of such systems include high and low pressure R410 refrigerant or equivalent systems (e.g., residential applications), high and low pressure R134a refrigerant or equivalent systems (e.g., mobile applications), and/or high and low pressure R477 refrigerant or equivalent systems (e.g., mobile applications). The fluid members can be used in a wide variety of other systems as well, including other conventional and future refrigerant systems.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hose member for conveying fluid comprising:
   a first tubular layer;
   a metal vapor barrier layer formed by at least one strip of metal surrounding the first tubular layer; and
   a second tubular layer surrounding the metal vapor barrier layer;
   wherein the at least one metal strip has edge portions joined together to form at least one seam, each edge portion having an outer face and an inner face, the inner faces being juxtaposed to form opposing faces, the opposing faces of the edge portions being metal-to-metal welded together; and wherein the at least one seam is folded over a portion of the metal strip adjacent the seam.

2. A hose member as set forth in claim 1, wherein the at least one metal strip includes a pair of metal strips surrounding respective halves of the first tubular layer, and wherein each metal strip has opposite edge portions overlapping respective opposite edge portions of the other strip to form a pair of seams.

3. A hose member as set forth in claim 1, wherein the at least one seam is ultrasonically welded.

4. A hose member as set forth in claim 1, wherein at least a portion of the seam is bonded to a portion of the metal strip adjacent the seam.

5. A hose member as set forth in claim 1, wherein the metal vapor barrier layer is bonded to at least one of the first tubular layer and second tubular layer.

6. A hose member as set forth in claim 1, wherein the metal strip is aluminum foil.

7. A method of making a hose comprising:
   providing a first tubular layer forming a conduit for the flow of fluid;
   forming a metal vapor barrier layer with at least one strip of metal surrounding the first tubular layer, the metal vapor barrier layer having at least one radially outwardly extending seam running in the longitudinal direction of the hose that is folded over a portion of the metal strip adjacent the seam, the seam being formed by edge portions of the at least one strip, the edge portions having an outer face and an inner face, the inner faces being juxtaposed to form opposing faces;

welding together the opposing faces of the at least one strip of metal to form a metal-to-metal weld; and providing a second tubular layer surrounding the metal vapor barrier layer.

8. A method as set forth in claim 7, wherein the metal vapor barrier layer is formed with a pair of metal strips surrounding respective halves of the first tubular layer, and wherein each metal strip has opposite edge portions overlapping respective opposite edge portions to form a pair of seams.

9. A method as set forth in claim 7, further comprising ultrasonically welding the at least one seam.

10. A method as set forth in claim 7, further comprising bonding at least a portion of the seam to a portion of the metal strip adjacent the seam.

11. A method as set forth in claim 7, further comprising providing a braid layer outside of the second tubular layer.

12. A method as set forth in claim 7, further comprising bonding the metal barrier layer to at least one of the first tubular layer and the second tubular layer.

13. A method as set forth in claim 7, wherein the bonding includes vulcanization.

14. A hose made by the method of claim 7.

15. A hose member for conveying fluid comprising:
a first tubular layer;
a metal vapor barrier layer surrounding the first tubular layer, the metal vapor barrier layer formed as a metal tube having at least one longitudinal seam formed radially outward from the metal tube, the longitudinal seam formed by edge portions of the metal vapor barrier layer that are juxtaposed to form opposing faces, the longitudinal seam folded over a portion of the metal tube adjacent the longitudinal seam with the opposing faces of the metal vapor barrier layer being metal-to-metal welded together; and
a second tubular layer surrounding the metal vapor barrier layer.

16. A hose member as set forth in claim 15, wherein the metal vapor barrier layer is formed from a pair of metal strips surrounding respective halves of the first tubular layer, and wherein each metal strip has opposite edge portions overlapping respective opposite edge portions of the other strip to form a pair of seams.

17. A hose member as set forth in claim 15, wherein the at least one seam is ultrasonically welded.

18. A hose member as set forth in claim 15, wherein at least a portion of the seam is bonded to a portion of the metal tube adjacent the seam.

19. A hose member as set forth in claim 15, wherein the metal vapor barrier layer is bonded to at least one of the first tubular layer and second tubular layer.

20. A hose member as set forth in claim 15, wherein the metal barrier layer is aluminum foil.

* * * * *